(12) United States Patent
Choi et al.

(10) Patent No.: US 9,727,733 B2
(45) Date of Patent: Aug. 8, 2017

(54) RISK-BASED MODEL FOR SECURITY POLICY MANAGEMENT

(75) Inventors: Christopher Young-Soo Choi, Southport (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 13/216,309

(22) Filed: Aug. 24, 2011

(65) Prior Publication Data

US 2013/0055337 A1 Feb. 28, 2013

(51) Int. Cl.
*H04L 29/00* (2006.01)
*G06F 21/57* (2013.01)

(52) U.S. Cl.
CPC .................. *G06F 21/577* (2013.01)

(58) Field of Classification Search
CPC .... G06F 21/00; G06F 21/577; G06F 21/6218; H04L 63/102; H04L 63/0227; H04L 63/1433; H04L 67/36; H04L 41/0213
USPC ........................................ 726/1–36
See application file for complete search history.

(56) References Cited

U.S. PATENT DOCUMENTS

| | | | |
|---|---|---|---|
| 5,970,064 A * | 10/1999 | Clark et al. ................... | 370/351 |
| 6,631,473 B2 | 10/2003 | Townsend | |
| 7,703,123 B2 | 4/2010 | Vail et al. | |
| 8,176,561 B1 * | 5/2012 | Hurst et al. ..................... | 726/25 |
| 2007/0143851 A1 * | 6/2007 | Nicodemus et al. ........... | 726/25 |
| 2007/0157286 A1 * | 7/2007 | Singh et al. ....................... | 726/1 |
| 2007/0180490 A1 * | 8/2007 | Renzi et al. ...................... | 726/1 |
| 2008/0047016 A1 * | 2/2008 | Spoonamore ................... | 726/25 |
| 2008/0168529 A1 * | 7/2008 | Anderson et al. ................ | 726/1 |
| 2008/0201179 A1 * | 8/2008 | Maes ................................ | 705/7 |
| 2009/0228316 A1 * | 9/2009 | Foley et al. ..................... | 705/7 |
| 2009/0276257 A1 * | 11/2009 | Draper et al. ................... | 705/7 |
| 2009/0288135 A1 * | 11/2009 | Chang et al. .................... | 726/1 |
| 2010/0275263 A1 * | 10/2010 | Bennett et al. ................ | 726/25 |
| 2011/0145884 A1 * | 6/2011 | Rivers et al. ..................... | 726/1 |

* cited by examiner

*Primary Examiner* — Don Zhao

(74) *Attorney, Agent, or Firm* — Jeffrey S. LaBaw; David H. Judson

(57) ABSTRACT

A security policy management solution (such as a Data Loss Prevention (DLP) system) is augmented to enable a user to model and visualize how changes in a security policy may impact (positively or negatively) the effectiveness of a policy configuration as well as the risk associated with its deployment. This technique enables a user (e.g., a security policy administrator) to evolve enterprise information technology (IT) security policies and, in particular, to generate and display "what-if" scenarios by which the user can determine trade-offs between, on the one hand, the effectiveness of a proposed change to a policy, and on the other hand, the risk associated with the proposed change.

19 Claims, 5 Drawing Sheets

RISK-BASED MODEL FOR SECURITY POLICY MANAGEMENT

BACKGROUND OF THE INVENTION

Technical Field

This disclosure relates generally to security policy management for information technology (IT) systems.

Background of the Related Art

Information security is the process of providing a set of controls to manage risk with an end goal of demonstrating compliance with a set of regulations. Security policies specify how a set of controls operate and therefore to what extent risk may be capable of being managed. The specific values for attributes in a schema of any security policy can be modified, and such modifications may change the probability of both positive impact (effectiveness at managing risk) and negative impact (unhappy users, loss of productivity) on the environment which the policy is intended to protect.

For example, Data Loss Prevention (DLP) systems are well-known in the prior art and operate generally to identify, monitor use of, and to control user operations on, sensitive information within an enterprise computing environment. Typically, DLP systems provide a policy-based mechanism for managing how data is discovered and classified on a user's workstation or file server, also known as an "endpoint." Policies must be distributed to, and enforced on, each endpoint. A representative DLP policy may be intended to limit the inappropriate use of sensitive content. Elements of a DLP policy that change its impact on the organization include, for example, the set of endpoints/users to which the policy is applied, the nature of the response when inappropriate use is detected (e.g. audit the event versus preventing the data leak by blocking user activity), and the strictness of the identification of sensitive data (e.g. validation of check sums on numerical data, number of occurrences, size of training sets, etc.)

Information security professionals also are aware of the concept of risk-based security management. Nevertheless, security policy management as a technology domain typically does not express policy explicitly in a way that recognizes the original purpose of risk management. In this regard, most commercial policy management systems do not provide policy versioning; moreover, in those systems that do, policy versions do not link to risk assessment. This gap is usually caused by the lack of continuity and consistency from the business view of information security through to the implementation in IT systems. With increasing emphasis on IT more directly supporting business objectives, and with IT being applied to new problem domains (such as smart energy), an overt representation of the link between security policy and risk is desired.

Existing security solutions typically use a predefined set of security levels and do not allow user-defined versions of policies to be configured. They also do not provide any mechanism to enable a user to associate (with a security policy) a risk assessment determined by an organization. More significantly, such approaches do not provide any reference to the potential negative impact of changing security levels.

There is a need in the art to provide for techniques to enable those responsible for policy management within an organization with the ability to link in a quantitative description of risk.

BRIEF SUMMARY OF THE INVENTION

The techniques herein augment a security policy management solution (such as a DLP system) to enable a user to model and visualize how changes in a security policy may impact (positively or negatively) the effectiveness of a policy configuration as well as the risk associated with its deployment. As used herein, a "policy" may refer to a single policy, or a set of policies. This technique enables a user (e.g., a security policy administrator) to evolve information technology (IT) security policies and to determine trade-offs between, on the one hand, the effectiveness of a proposed change to a policy, and on the other hand, the risk associated with the proposed change.

In one embodiment, a data processing system implements a policy change management technique. The technique begins by a user defining a version of a policy (e.g., a data loss prevention policy, an identity provisioning policy, a web access control policy, and the like), or a set of such policies. The policy typically has a schema associated therewith, and the schema may have one or more attributes. A policy schema attribute may be assigned a value in a given instantiation of a policy. Thus, for example, in a security policy schema, an attribute may be "number of users affected," an "enforcement action," or the like. According to the technique, for a given instantiation of a policy, an "effectiveness" score is then assigned to the policy schema attribute. This score corresponds to a potential "effectiveness" of the policy. In addition, and according to the technique, a "risk" of the policy is also quantified, e.g., by assigning a measure of a potential for negative impact of the policy on a policy schema attribute. This "risk" is sometimes referred to herein as "policy risk" or "implementation risk" Once the effectiveness and risk are quantified, a relationship of the effectiveness and risk associated with the version of the security policy is then determined. Preferably, this relationship is plotted in a visual manner, together with a similar representation for at least one prior version of the policy. By comparing the plots, the user (e.g., a security administrator) can readily determine whether and to what extent the policy should be changed, e.g., by adopting the user-defined version, by defining a new version, or the like.

Preferably, the user-defined versions are created using a menu-based or graphical user interface-based configuration tool. The resulting display visualizations enable the user to design security policy changes while evaluating "what-if" scenarios for the proposed security policy changes.

In one embodiment, the relationship between effectiveness and risk of a security policy variant is represented in two (2)-dimensional space. One or more effectiveness attributes/metrics may be combined into a single effectiveness metric in that representation. Likewise, one or more risk attributes/metrics may be combined into a single risk metric in that representation. In an alternative embodiment, such relationship data is represented in n-dimensional space, where each dimension represents an attribute in the policy schema, and each point in n-dimensional space may represent a policy instance annotated with its assigned effectiveness and risk metrics.

According to another aspect, the above-described technique is performed in a policy change management apparatus. The apparatus comprises a processor, and computer memory that holds computer program instructions executed by the processor to carry out the technique.

According to still another aspect, the above-described technique is performed by a computer program product in a computer readable medium for use in policy change management system. The computer program product holds computer program instructions which, when executed by the data processing system, perform the technique.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
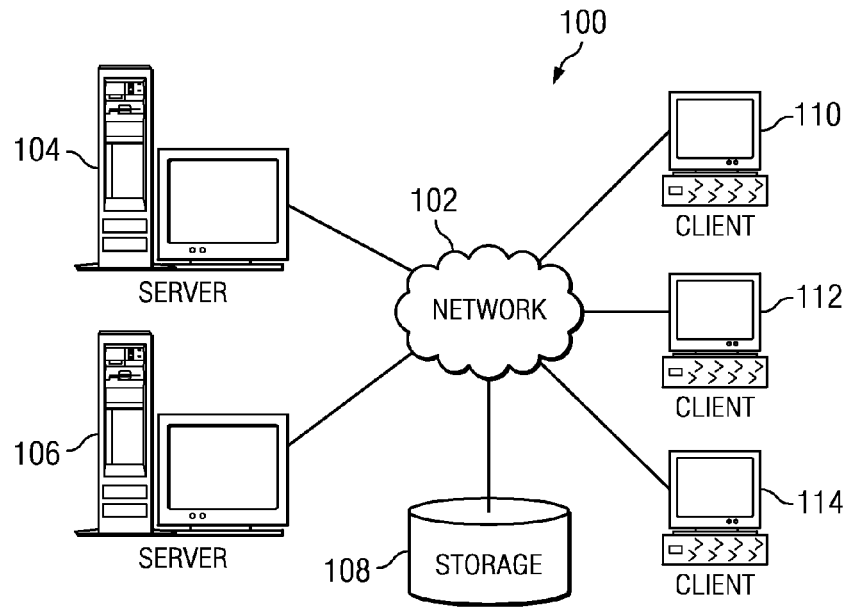
FIG. 1 depicts an exemplary block diagram of a distributed data processing environment in which exemplary aspects of the illustrative embodiments may be implemented.
Figure 2:
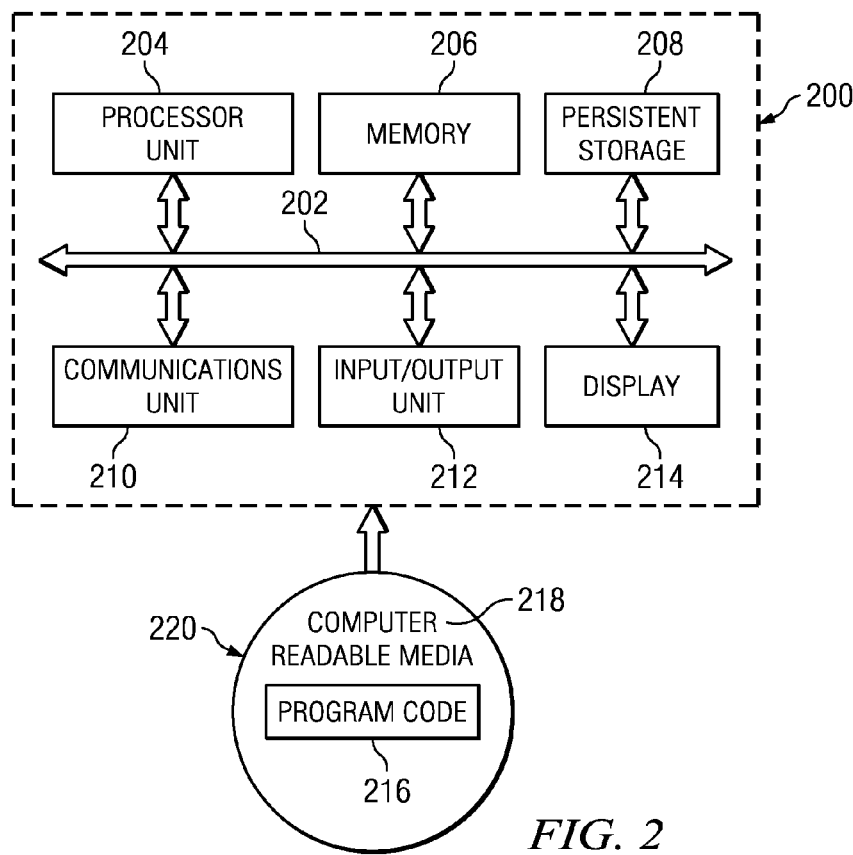
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
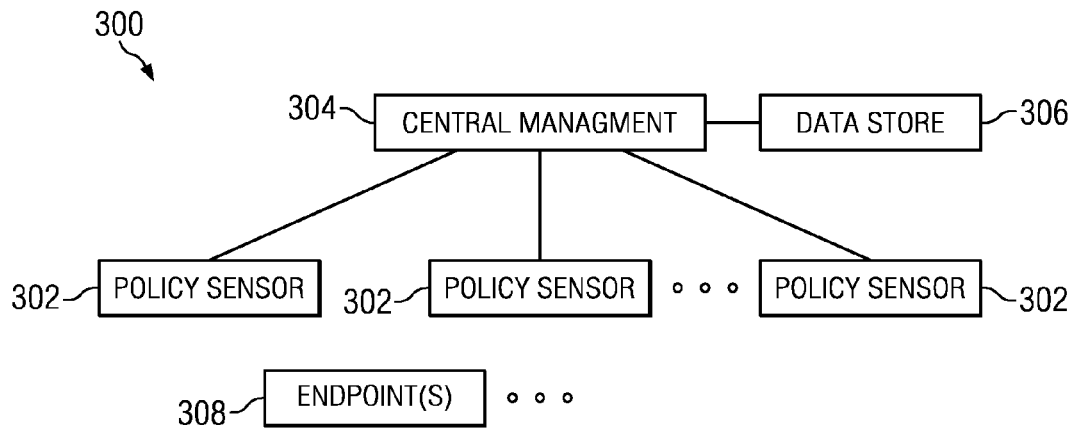
FIG. 3 illustrates a known data loss prevention (DLP) solution in which the subject matter of this disclosure may be implemented.

Although not meant to be limiting, and as described below, a representative data processing system in which the techniques of this disclosure are implemented is an appliance-based data loss prevention (DLP) solution. DLP systems are well-known and work to reduce the risk of sensitive data loss, primarily at the network layer. As seen in FIG. 3, a representative DLP solution 300 comprises a set of distributed components, typically arranged in a tiered architecture. Multiple policy sensors 302 are placed around the network (typically as rack-based appliances, software applications, or the like) and are designed to detect and/or prevent data loss. Generally, in an appliance-based implementation, an appliance may comprise a data processing system such as described in FIG. 2. The appliance includes a policy engine that works generally by capturing packets from the network, reassembling the packets into sessions, analyzing the information flow, extracting content for analysis, and performing content analysis to identify sensitive information. The appliance may use system-defined or user-defined policies, where a policy represents a group of one or more rules. A rule typically is a logical combination of one or more triggers that are content-based, location-based and/or flow-based. Sessions with policy violations are detected by the sensors and forwarded a central management console 304 that distributes policies and collects and organizes alerts. A data store 306 is used to store data and policies, typically in a database. The central management console 304 includes a web-based graphical user interface (GUI) for management, administration and reporting. As used herein, the type of sensitive information protected by such a DLP solution may be quite varied. Typically, such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. As also seen in FIG. 3, the DLP solution is implemented across one or more endpoints 308. Without limitation, endpoints may be end user desktops, workstations or laptops, or servers.

Preferably, a policy is created and managed in the central management console (such as shown in FIG. 3).

Thus, in general a DLP system provides a policy-based mechanism for managing how data is discovered and classified on an endpoint workstation, file server or other device within an enterprise. An endpoint is a data processing system (such as described above in FIG. 2) and that has an associated file system (or equivalent data store). The endpoint may execute DLP software. An endpoint typically includes a DLP application that executes as software, i.e., as a set of program instructions, executed from computer memory by a processor. The DLP application is configurable according to a policy, where the policy is created and managed in a central management console (such as shown in FIG. 3). This is not a limitation, however, as a particular DLP policy may be implemented locally (at the endpoint itself).

Risk-Based Model for Security Policy Management

As described above, the techniques herein augment or enhance a security policy management solution (including but, without limitation, a DLP system) to enable a user to model and visualize how changes in a security policy may impact (positively or negatively) the effectiveness of a policy configuration as well as the risk associated with its deployment. As noted above, a "policy" may refer to a single policy, or a set of policies (a "policy set"). As will be seen, this technique enables a user, such as a security policy administrator, to evolve an enterprise information technology (IT) security policy and, in particular, by determining trade-offs between an effectiveness of a proposed change to a policy, and a risk associated with the proposed change.

In one embodiment, a method of policy change management is implemented in a data processing system, such as a data processing system as implemented in FIG. 2. The data processing system may be connected as a client or a server, such as shown in FIG. 1, although this is not a limitation, as the techniques described below may be implemented within a standalone computing system.

The particular techniques may be used to facilitate management of any type of policy including, without limitation, a security policy, an access policy, a data loss prevention policy (such as in a DLP system), an identity provisioning policy, a web access control policy, and the like.

According to the method, an effectiveness versus risk relationship (or characteristic) for a new version of a policy is visualized against a similar relationship for one or more prior versions of the policy. Using this visualization technique, a user can determine how best to evolve a particular IT policy. By associating a particular user-defined policy version with an assessment of risk, and preferably, an organization's own assessment of such risk, the resulting policy configuration change can be evaluated and made in a much more intelligent fashion as compared to the prior art.

Figure 4:
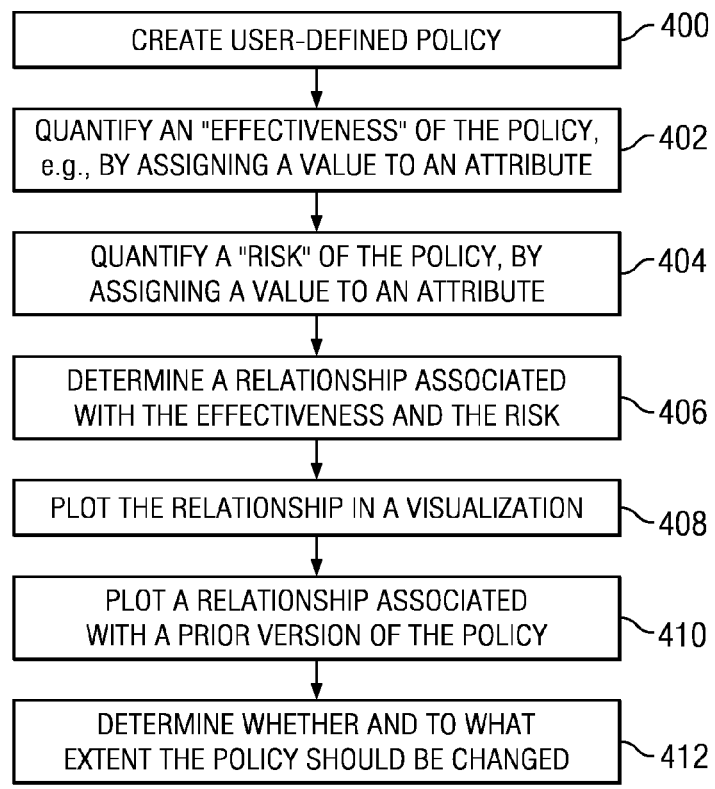
FIG. 4 illustrates a process flow illustrating a method for policy change management according to this disclosure.

To this end, and as illustrated in FIG. 4, a method of change management begins at step 400 by a user defining a version of a policy. As noted above, the policy typically has a schema associated therewith, and the schema may have one or more attributes. A policy schema attribute may be assigned a value in a given instantiation of a policy. Thus, for example, in a security policy schema, an attribute may be "number of users affected," an "enforcement action," or the like. Step 400 creates a user-defined policy. Policy management systems typically include such functionality, e.g., using software tools and user interface displays. At step 402, an "effectiveness" of the policy is then quantified, e.g., by assigning a value to an attribute (or metric) associated therewith. At step 404, a "risk" of the policy is also quantified, typically by assigning a measure of a potential for negative impact of the policy on an attribute (or metric) associated therewith. Steps 402 and 404 generate values for these measures. Steps 402 and 404 may be carried out concurrently, or in reverse order. Once the effectiveness and policy risk are specified and quantified, the method continues at step 406. At this step, a relationship of the effectiveness and policy risk associated with the version of the security policy is then determined. Preferably, this relationship is then plotted in a visual manner, as indicated by step 408. At step 410, a similar effectiveness versus risk representation for at least one prior version of the policy is also plotted. The representations preferably are plotted on a computer-implemented display, although this is not a limitation, as any convenient visual representation may be used. At step 412, and by comparing the plots, the user determines whether and to what extent the policy should be changed, e.g., by adopting the user-defined version, by defining a new version, or the like. This completes the process.

Although FIG. 4 describes a single what-if scenario involving the creation of a single policy version and the comparison of the version to a single prior version, this is not a limitation. The same technique can be adapted to provide for multiple "what-if" scenarios, both sequentially, and concurrently. The resulting display visualizations (at step 410 and 412) enable the user to design security policy changes while evaluating "what-if" scenarios for the proposed security policy changes.

In addition to enabling "what-if" scenarios to be evaluated, the technique enables the user to visualize the history of a given policy or policy set that has been deployed and re-configured in the past. By being able to visualize multiple policy instances in this manner, a security administrator also has greater insight into the "what-if" scenarios that then may be selected for evaluation. In addition, by having the history, the security administrator may restore the policy state to a known version if moving to a new policy version has caused other unintended consequences (i.e., the negative impact or the risk has been realized).

Figure 5:
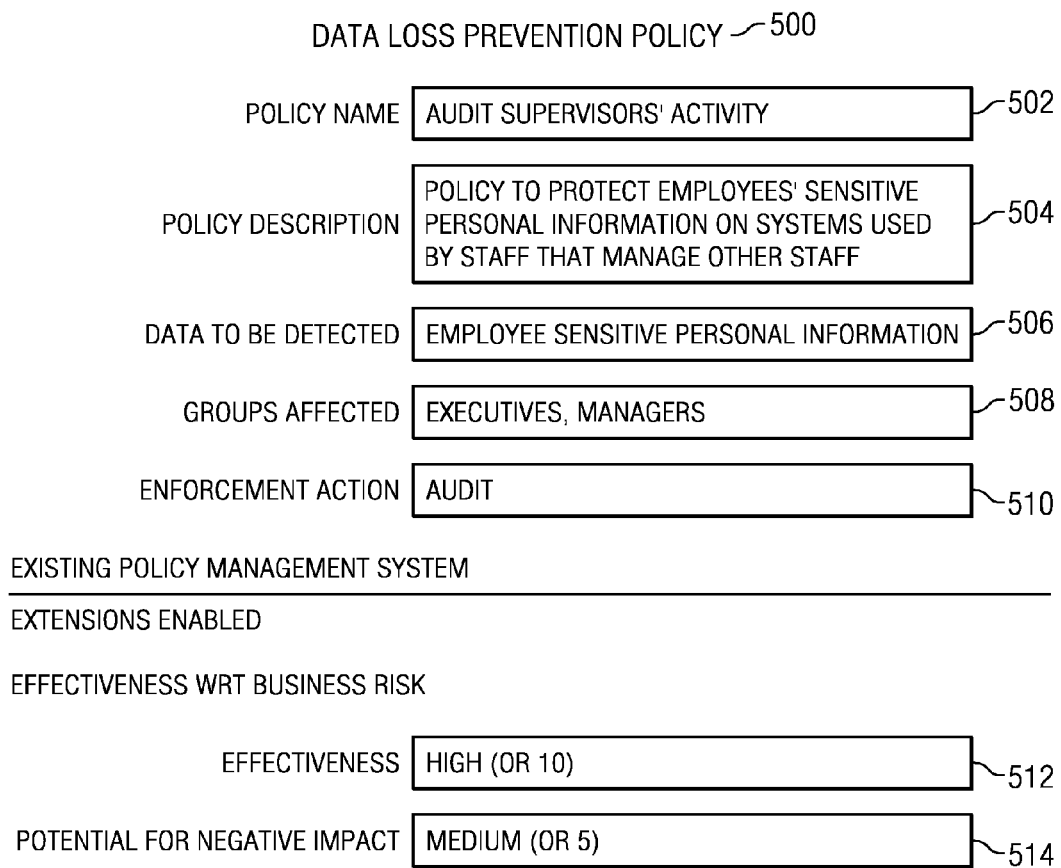
FIG. 5 illustrates a policy configurator tool interface by which a user defines a policy and associates effectiveness and risk measures to that policy.

Preferably, the user-defined version is created at step 400 using a menu-based or graphical user interface-based configuration tool. FIG. 5 illustrates a representative policy configuration interface that may be used for this purpose. In this example, the policy system implements a data loss prevention (DLP) policy. Thus, the tool illustrated in FIG. 5 provides a number of fill-in data fields including, without limitation, a policy name field 502, a policy description filed 504, a "data to be detected" field 506, a "groups affected" field 508, and an "enforcement action" field 510. These field names/tags are not meant to be limiting. Collectively, the data entered by the user into the upper portion of the interface 500 creates a "user-defined policy," which is step 400 in FIG. 4. Of course, one skilled in the art will appreciate that the scope and content of the data fields will vary depending on the type of policy being configured. Moreover, other types of GUI widgets (such as drop-down lists, radio buttons, and the like) may be used (in lieu of the fill-in fields) to receive the data being entered.

As also seen in FIG. 5, and according to this disclosure, the existing policy management system configuration tool is extended or augmented to include several additional fill-in fields. These extensions enable the user to specify and quantify the "effectiveness" and "risk" measures that have been described above. In this example, the display panel 500 is extended to include an "effectiveness" field 512, together with a "risk" field 514. In this embodiment, the effectiveness field 512 receives a value that either is numeric, text, or alphanumeric, and that quantifies the effectiveness of the policy version being defined. Likewise, the risk field 514 receives a value that either is numeric, text, or alphanumeric, and that quantifies the risk of the policy version being defined. Either or both of the effectiveness and risk values may be user-specified, or system-specified. Typically, an end user specifies these values manually, but this is not a limitation, as one or both values may be calculated or derived programmatically.

The display tool configurator may be implemented in the central management console in FIG. 3 or, more generally, in any data processing system such as shown in FIG. 2. Using the configurator, a user defines a policy version (which may be an initial version). The policy version associates "effectiveness" with "risk," the latter typically being a risk metric that reflects the administrator's assessment of the risk of implementing the policy version (or some aspect thereof). The risk metric also may be a pre-defined or specified risk metric that is received from an external source or system.

As used herein, effectiveness typically is a measure of the extent to which the particular policy configuration being defined reduces a particular business risk to the organization. In the context of a DLP system, the business risk is a risk of loss or theft of sensitive information, or the like. Typically, this "business risk" is distinct from the policy (or implementation) risk that has been described above, which for purposes of this disclosure and as previously defined is a measure of a potential for negative impact of the policy configuration. A representative policy risk may be loss of productivity from an overly restrictive policy. According to this disclosure, and to simplify the measurement and comparison, a particular policy may be decomposed into one or more dimensions that impact or influence the effectiveness and the risk. These dimensions correspond to policy schema attributes for a given instantiation of the policy. For example, in one example embodiment, the dimensions (the policy schema attributes) considered are "enforcement action" and "number of users affected." These identifiers/tags are merely illustrative, and they should not be taken as limiting. An example of an "enforcement action" is an increase in the level of enforcement from "audit" to "deny" in an authorization or data loss prevention policy. This change increases the effectiveness of the policy, but it also increases the risk of adversely impacting the productivity of the employees. The other dimension, "number of users affected," is a metric that is self-defining. Typically, an increase in the number of users affected by the policy increases the effectiveness of the policy but also increases the risk that any errors in the configuration having a wider spread effect.

Figure 6:
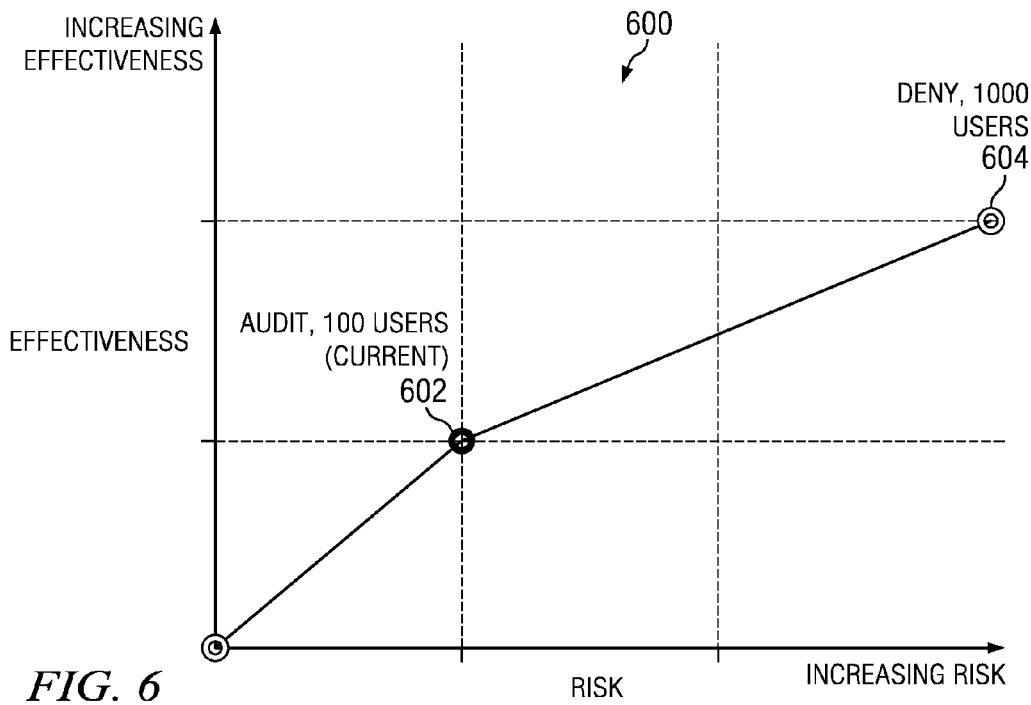
FIG. 6 illustrates a first visualization according to this disclosure wherein multiple instances of security policy configuration are mapped across a two (2)-dimensional space.

According to this disclosure, preferably the configuration of policies is modeled in one of the several ways. In one approach, as shown in FIG. 6, multiple instances of security policy configuration are mapped across a two (2)-dimensional space 600, with each axis representing one of the effectiveness/risk metrics mentioned previously. In particular, in this example, the "y" axis indicates "effectiveness" (and, in particular, effectiveness of the particular policy for addressing the business risk), while the "x" axis indicates the potential for negative impact of applying this particular policy. As shown, each circle in the diagram represents a specific instance or a specific version of the policy configuration. Thus, the visualization represents multiple policies which collectively address a particular security requirement. The point of origin (x, y)=(0, 0), represents no policy being deployed. The current policy is represented by circle 602, while a new policy version is represented by circle 604. As the plot indicates, moving away from the point of origin, which as noted above represents no policy being deployed, increases the effectiveness of the policy configuration as well as the risk associated with its deployment. The absolute distance from the origin need not be quantified, because preferably the visualization is used to guide the progression of the policy configuration based on the relative measures of risk (as reflected in the plot). For example, in the plot shown in FIG. 6, the security administrator can immediately recognize that there are two configurable versions of the policy or policies: auditing security violations associating with 100 users (configuration A), and denying violations associated with 1000 users (configuration B). Further, by simply examining the plot, it is clear that moving from configuration A to configuration B increases both the effectiveness and the risk. Using this policy definition and display methodology, a security administrator can determine a next logical phase of the policy configuration by examining various tradeoffs between the effectiveness and the risk associated with a next phase (or subsequent phases).

Figure 7:
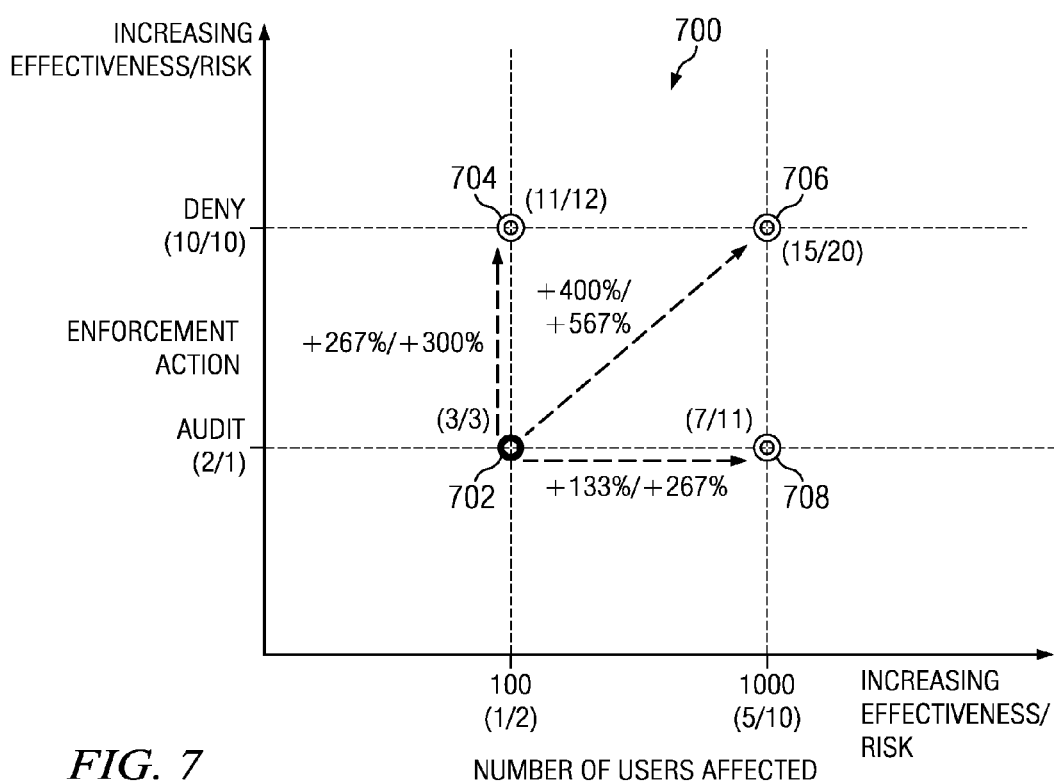
FIG. 7 illustrates a second visualization according to this disclosure wherein multiple policy dimensions (attributes) that impact effectiveness and risk are mapped in the space.

An alternative implementation is shown in FIG. 7, which illustrates a visualization 700 in which multiple policy dimensions (that impact the effectiveness and the risk) are combined together. Thus, in this alternative approach, in effect, a number of effectiveness attributes are combined into a single effectiveness attribute, while a number of risk attributes are combined into a single effectiveness attribute. Referring now to the specific example, as in the previous example (FIG. 6), the policy dimensions that impact the effectiveness and the risk are identified. As before, "enforcement action" and "number of users affected" are utilized for this purpose. For each dimension, the user then defines levels of increasing effectiveness and risk. For each level, the effectiveness and risk factors are defined, preferably using numeric values that are specified by the policy administrator based on experience, historical data, or some combination. Each circle in this diagram represents a particular state of the policy, with circle 702 representing a current state, and circles 704, 706 and 708 representing a particular state of the policy at a future time (each a policy "version" as has been described). In this example, the numeric values are merely exemplary and, as noted above, these values typically are specified by the administrator (or are otherwise made available to the system). The effectiveness/risk values are shown. Preferably, just like the distance values in FIG. 6 did not influence the data, the effectiveness and risk factors preferably are relative so the actual numbers do not necessarily matter so long as they are relative increments to the preceding levels. As can be seen, and as represented by the circles 704, 706 and 708, in this example different versions of policy configuration are configured at specific points in the space depicted. In particular, each circle in the diagram represents a specific policy configuration. One such configuration (i.e., circle 702) represents auditing violations across 100 users. In the example, this configuration has a perceived effectiveness of "3" and risk of "3," which is an aggregate of the risk metrics along all represented dimensions. The policy configuration is "changed" in effect by moving along one or more dimensions. As can be seen, as the position of the effective policy changes, the total risk and the effectiveness factor are displayed. Using this visualization, the security administrator can simulate the policy change to determine the relative risk before committing the policy change.

The visualizations shown in FIG. 6 and FIG. 7 may be provided by a display interface, such as a graphical user interface (GUI) operating in a data processing system.

The particular techniques for authoring different instances of policy configuration and ranking them based on their risk metrics (effectiveness and risk) may utilize known methodologies (and are outside the scope of this disclosure). Of course, if an organization is risk-adverse and prefers a phased approach, then more time should be invested in determining the dimensions of the policy that impacts the risk. This allows more fine-grained evolution of the policy configuration, as it enables the configuration to be changed in smaller increments along only one of the dimensions. If, on the other hand, the organization is time-constrained to meet a specific set of compliance requirements, then coarse-grained levels may be needed and a simpler model (such as shown in the example in FIG. 7) is preferred. In some cases, certain dimensions of a policy will be of lower risk for certain organizations. For example, for an organization that uses a small set of roles, it might be relatively low risk to apply the policies to a larger number of users because the policies are still being applied to the same types of users. In this case, moving the policy configuration along the "number of users affect" dimension represents a lower risk compared to moving the configuration along the "enforcement action" dimension. Preferably, the visualization tool is configurable to represent the difference in relative magnitude.

Although FIG. 6 and FIG. 7 illustrate just two policy dimensions to simplify the visualization, this is not a limitation. The techniques described herein may be implemented with higher dimensions (n-dimensional space).

Figure 8:
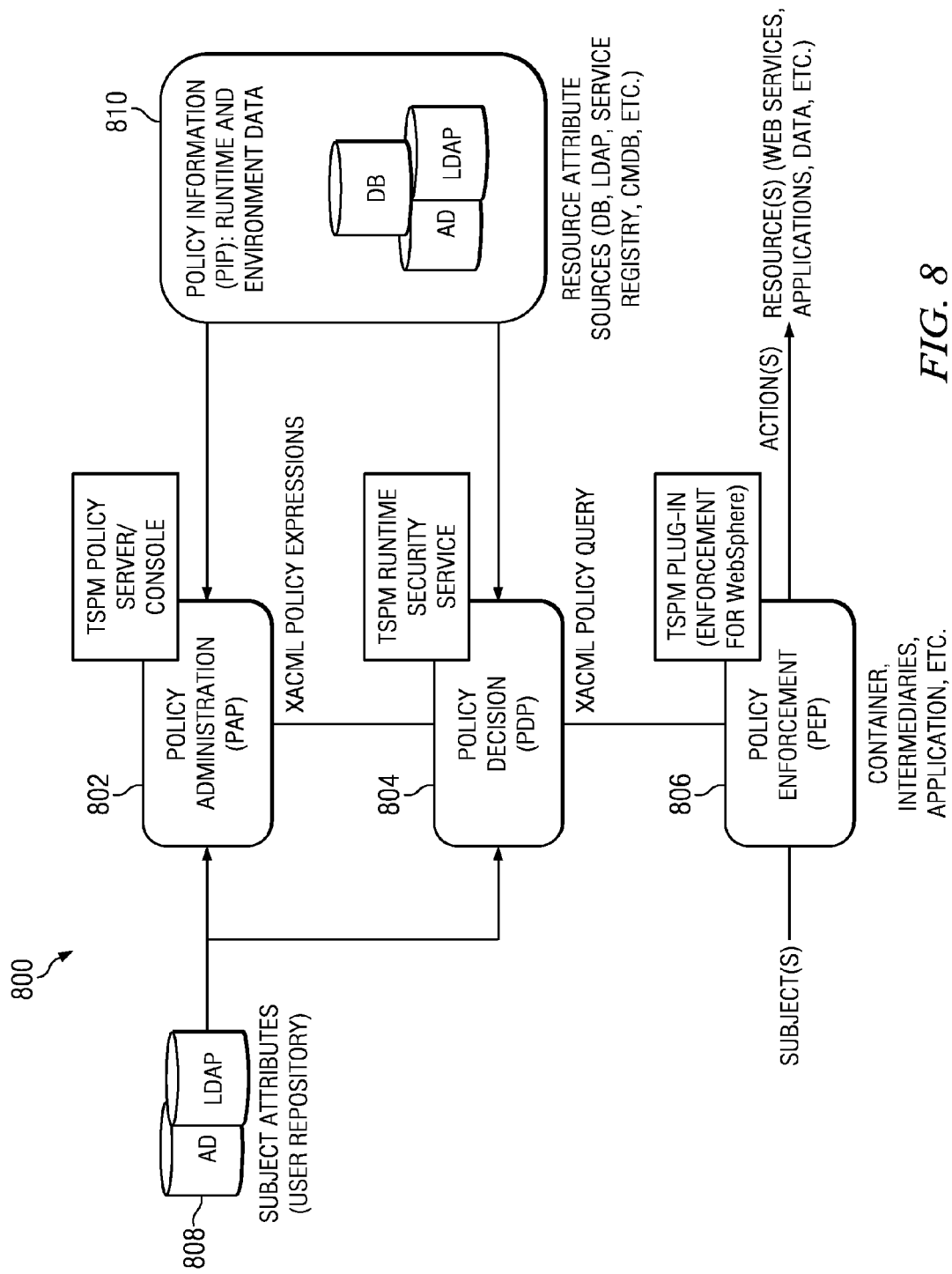
FIG. 8 illustrates a policy management system in which the techniques of this disclosure may be implemented.

FIG. 8 illustrates a representative policy management system 800 in which the above-described technique may be implemented. The system 800 may be implemented across one or more machines operating in a computing environment, such as shown in FIG. 1. Typically, the system comprises a policy administration point (PAP) 802, a policy decision point (PDP) 804, and a policy enforcement point (PEP) 806. Generally, the policy administration point 802 is used to define a policy, which may be specified as a set of XACML policy expressions. This policy uses subject attributes provided from a user repository 808, as well runtime and environment data received from policy information point (PIP) 810. The policy decision point (PDP) 804 receives similar information and responds to an XACML policy query received from the policy enforcement point (PEP) 806 to enforce the policy on a subject and with respect to a particular action initiated by the subject. In one commercial implementation of this approach, the PAP 802 is implemented by IBM® Tivoli® Security Policy Manager (TSPM) policy service/console, the PDP 804 is implemented in the TSPM runtime security service, and the PEP is implemented as a TSPM plug-in to WebSphere® Application Server. In this embodiment, which is merely illustrative, the policy definition and visualization technique is implemented within the policy administration point.

The visualization may be implemented with any convenient visualization tool. Representative tools for this purpose include an user interface (UI) toolkit, whether web-based or thick client-based. Examples include, without limitation, Eclipse plug-ins, Dojo JavaScript widgets, Adobe® Flash, Microsoft® .NET controls, and the like.

The subject matter described herein has many advantages. The technique provides for more explicit linkage between business and technical views of security policy in an organization. It enables better and more efficient planning for the evolution of a particular security policy (or policies) throughout a rollout of an IT system with security controls. Further, it enables the relationship between security policy and risk to be an integrated artifact of an IT system, as opposed to separate considerations.

The visualization technique described herein enables the quantifying of the negative impact of applying a security policy or a plurality of security policies. As such, the described technique recognizes and addresses the practical and operational limitations of a security policy management system. The technique advantageously provides the user with insight into the net effectiveness of a security policy, preferably by incorporating the operational risk (i.e., the negative impact) of employing that policy, not merely the benefits thereof (which can also be visualized, as described). The described technique has the further advantage in that it provides a way of modeling or representing the natural progression of enterprise-wide security policies and associated effectiveness, as well as the risk associated with each phase of that progression. The subject disclosure facilitates predictive modeling and visual representation of policy data so that the operational risk of employing a particular policy can be seen.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the DLP policy association functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the policy definition and visualizations described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing policy management solution, as has been described In a representative embodiment, a policy management central management console (e.g., a DLP central management console) exposes one or more web-based interfaces that may be used to create and/or modify a policy, and/or to visualize the policy effectiveness/risk relationships in the manner described.

As noted, the described functionality may be implemented as an adjunct or extension to an existing policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques disclosed herein are not limited to a middleware policy management appliance (such as a DLP appliance) that monitors network traffic such as has been described, but this will be a typical implementation. As noted, the above-described identity-centric policy association function may be used in any system, device, portal, site, or the like wherein it is desired to analyze data for inclusion of sensitive information.

As used herein, the term "quantifying," as it relates to an "effectiveness" measure or a "risk" measure, refers to generating such a measure, or receiving the measure as generated by another person, entity or automated system.

Having described our invention, what we now claim is as follows.

The invention claimed is:

1. An apparatus for policy change management, comprising:
    a processor;
    computer memory holding computer program instructions that when executed by the processor perform a method comprising:
        defining a version of a policy, the policy having a schema associated therewith, the schema having a set of attributes;
        quantifying an effectiveness of the policy version by assigning a value to a first policy schema attribute;
        quantifying a policy risk associated with the policy version by assigning a measure of potential for negative impact of the policy on a second policy schema attribute;
        mapping, on a machine-implemented graphical display, the effectiveness and the policy risk for the policy version using the value of the first policy schema attribute and the measure of potential for negative impact on the second policy schema attribute; and
        comparing the policy version with a prior version of the policy to determine whether the policy version is to be implemented.

2. The apparatus as described in claim 1 wherein the method further includes mapping, on the graphical display, the effectiveness and the policy risk for the prior version of the policy.

3. The apparatus as described in claim 2 wherein the comparing step displays a visual representation, as a two (2)-dimensional space, on the graphical display.

4. The apparatus as described in claim 1 wherein the first policy schema attribute comprises a plurality of effectiveness attributes combined into a single effectiveness attribute.

5. The apparatus as described in claim 1 wherein the second policy schema attribute comprises a plurality of policy risk attributes combined into a single policy risk attribute.

6. The apparatus as described in claim 1 wherein the effectiveness and the policy risk for the policy version are mapped in an n-dimensional space.

7. A computer program product in a non-transitory computer readable medium for policy change management in a data processing system, the computer program product holding computer program instructions which, when executed by the data processing system, perform a method comprising:
defining a version of a policy, the policy having a schema associated therewith, the schema having a set of attributes;
quantifying an effectiveness of the policy version by assigning a value to a first policy schema attribute;
quantifying a policy risk associated with the policy version by assigning a measure of potential for negative impact of the policy on a second policy schema attribute;
mapping, on a machine-implemented graphical display, the effectiveness and the policy risk for the policy version using the value of the first policy schema attribute and the measure of potential for negative impact on the second policy schema attribute; and
comparing the policy version with a prior version of the policy to determine whether the policy version is to be implemented.

8. The computer program product as described in claim 7 wherein the method further includes mapping, on the graphical display, the effectiveness and the policy risk for the prior version of the policy.

9. The computer program product as described in claim 8 wherein the comparing step displays a visual representation, as a two (2)-dimensional space, on the graphical display.

10. The computer program product as described in claim 7 wherein the first policy schema attribute comprises a plurality of effectiveness attributes combined into a single effectiveness attribute.

11. The computer program product as described in claim 7 wherein the second policy schema attribute comprises a plurality of policy risk attributes combined into a single policy risk attribute.

12. The computer program product as described in claim 7 wherein the effectiveness and the policy risk for the policy version are mapped in an n-dimensional space.

13. An apparatus, comprising:
a display interface;
a processor;
computer memory holding computer program instructions executed by the processor to generate and display, on the display interface, a first representation, and a second representation, the first representation mapping effectiveness versus policy risk for a current version of a policy, and the second representation mapping effectiveness versus policy risk for a proposed version of the policy, wherein the effectiveness is defined by a value assigned to a first policy schema attribute, and the policy risk is defined by a measure of potential for negative impact of the policy assigned to a second policy schema attribute.

14. A method of policy change management, comprising:
defining a version of a policy, the policy having a schema associated therewith, the schema having a set of attributes;
quantifying an effectiveness of the policy version by assigning a value to a first policy schema attribute;
quantifying a policy risk associated with the policy version by assigning a measure of potential for negative impact of the policy on a second policy schema attribute;
mapping, on a machine-implemented graphical display, the effectiveness and the policy risk for the policy version using the value of the first policy schema attribute and the measure of potential for negative impact on the second policy schema attribute; and
comparing the policy version with a prior version of the policy to determine whether the policy version is to be implemented;
wherein at least one of the quantifying and comparing steps is carried out in software executing in a hardware element.

15. The method as described in claim 14 further including mapping, on the graphical display, the effectiveness and the policy risk for the prior version of the policy.

16. The method as described in claim 15 wherein the comparing step is performed visually, using the graphical display.

17. The method as described in claim 14 wherein the first policy schema attribute comprises a plurality of effectiveness attributes combined into a single effectiveness attribute.

18. The method as described in claim 14 wherein the second policy schema attribute comprises a plurality of policy risk attributes combined into a single policy risk attribute.

19. The method as described in claim 14 wherein the effectiveness and the policy risk for the policy version are mapped in an n-dimensional space.

* * * * *